K. JUKES.
WEIGHING MACHINE.
APPLICATION FILED DEC. 20, 1920.

1,399,433.

Patented Dec. 6, 1921.
3 SHEETS—SHEET 1.

Inventor:
Karl Jukes
By [signature]
Attorney.

Inventor:
Karl Jukes

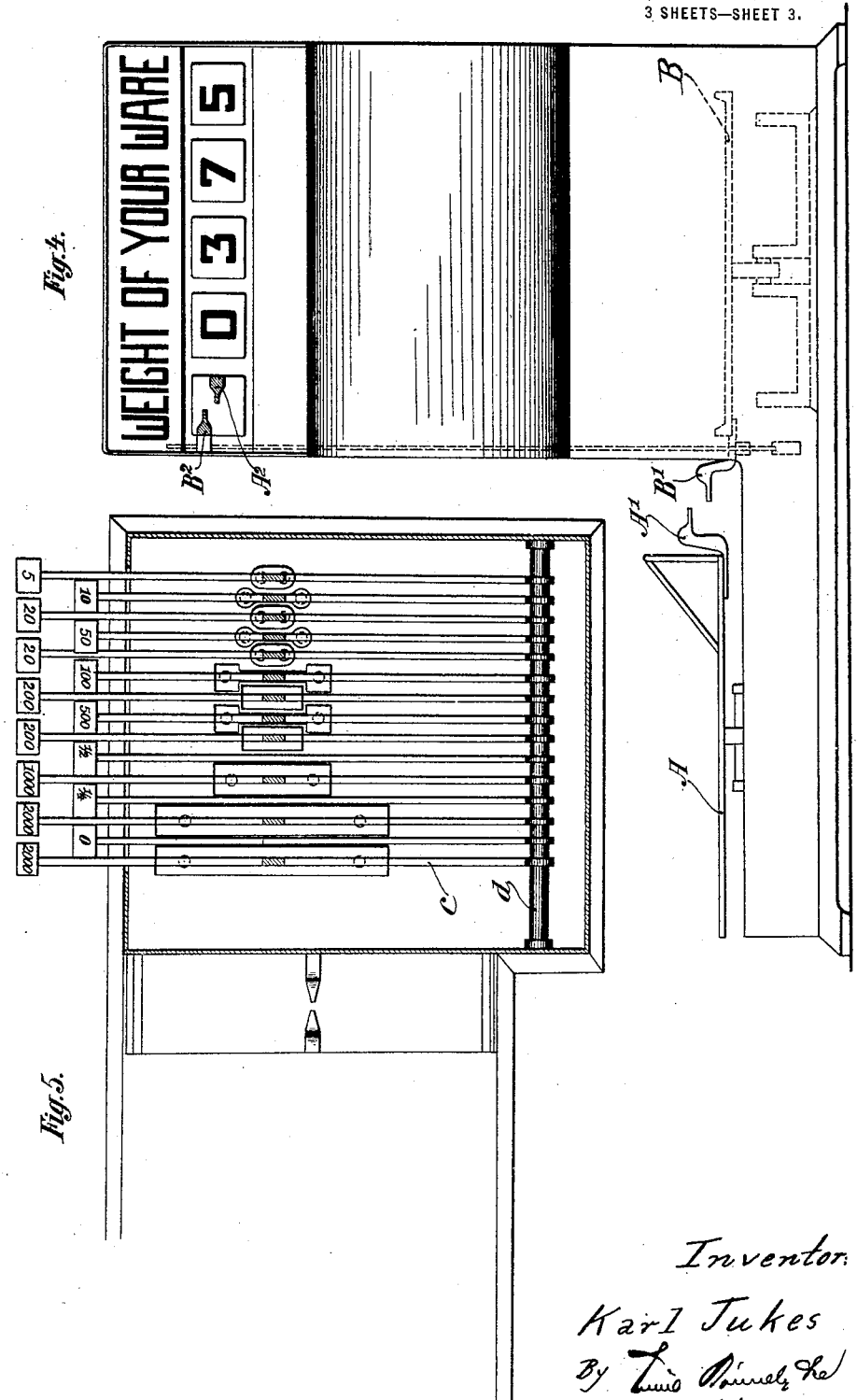

UNITED STATES PATENT OFFICE.

KARL JUKES, OF WUTHENOW, NEAR NEURUPPIN, GERMANY.

WEIGHING-MACHINE.

1,399,433.　　　　　Specification of Letters Patent.　　Patented Dec. 6, 1921.

Application filed December 20, 1920. Serial No. 432,126.

*To all whom it may concern:*

Be it known that I, KARL JUKES, engineer, citizen of the Prussian Republic, residing at Wuthenow, near Neuruppin, country house "Waldfrieden," Germany, have invented certain new and useful Improvements in or Relating to Weighing-Machines, (for which I have filed an application in Germany, Feb. 27, 1918,) of which the following is a specification.

The present invention relates to weighing machines; and it resides, briefly, in the provision of improved devices by means of which the weights are shifted into and out of action, the object being to render the power which is utilized for moving the weights independent of the weights themselves.

According to the invention, spring-supported levers for moving the weights are provided, which levers are balanced with relation to the respective weights, so that in depressing any one of said levers, only that force has to be overcome which serves for holding the lever in its highest position. This improved suspension mounting has the advantage that the amount of power necessary for moving the heaviest weights is only slightly different from that required for moving the smallest weights. The operation of the weighing mechanism is, therefore, independent of the load of the weights and practically uniform.

For locking the weighing levers in their lowermost position, automatic pawls already known in other weighing machines are employed, and likewise a lever for unlocking or releasing the pawls for the purpose of returning said levers to their position of rest. According to this invention, the said pawls are associated with the returning crank or lever in such a manner that the power of the springs is exerted on the returning crank during the upward or return movement of the weighing levers, with the result that the said crank itself is brought back to its initial position after having been depressed. This arrangement has the advantage that in operating the return crank a uniform braking action may be exerted on the levers to be returned.

For the purpose of lowering several weights at the same time upon the scale platform by a single operation, the corresponding levers are connected with a special lever in such a manner that they may be pressed down simultaneously when said lever is operated. Special levers of the character in question are those for weighing amounts corresponding to one-quarter or one-half a pound, the combined weights carried by the levers controlled by the special levers totaling such amounts. A considerable saving of time may be obtained by this arrangement.

A further improvement involved in the invention relates to an indicating scale, the number or diget disks of which are controlled by the weighing levers in the usual manner. According to the invention, ten disks arranged one behind another are provided for each unit, these disks being controlled by levers of the corresponding denominational units of weights by means of lifter levers in such a manner that the shoulders provided on said levers act to lift a certain number of disks into the path of the sight-window, such number corresponding to the weights put down. During this operation an addition of the several weights put down on the scale platform takes place, so that the indicating mechanism always shows the total, which could not be done in former apparatus of this kind. For the purpose of neutralizing or counterbalancing the weight of vessels or the like before the weighing operation proper can be effected, a special lever is employed which, by means of a crank, acts to automatically throw out all of the lifter levers. By this arrangement it is possible to render visible for the purpose of control only the proper weight of the goods.

A further improvement comprised in the invention consists in arranging the special levers between the highest weights, whereas the remaining weights are interfitted, certain of them projecting in front of and behind the contiguous weights, so that the weights may be arranged on a small portion of the scale platform.

An embodiment of the invention is illustrated in the accompanying drawing, in which:—

Fig. 4 is a front elevation of the complete machine.

Fig 5 is a part-sectional plan view of Fig. 4.

Figure 1:
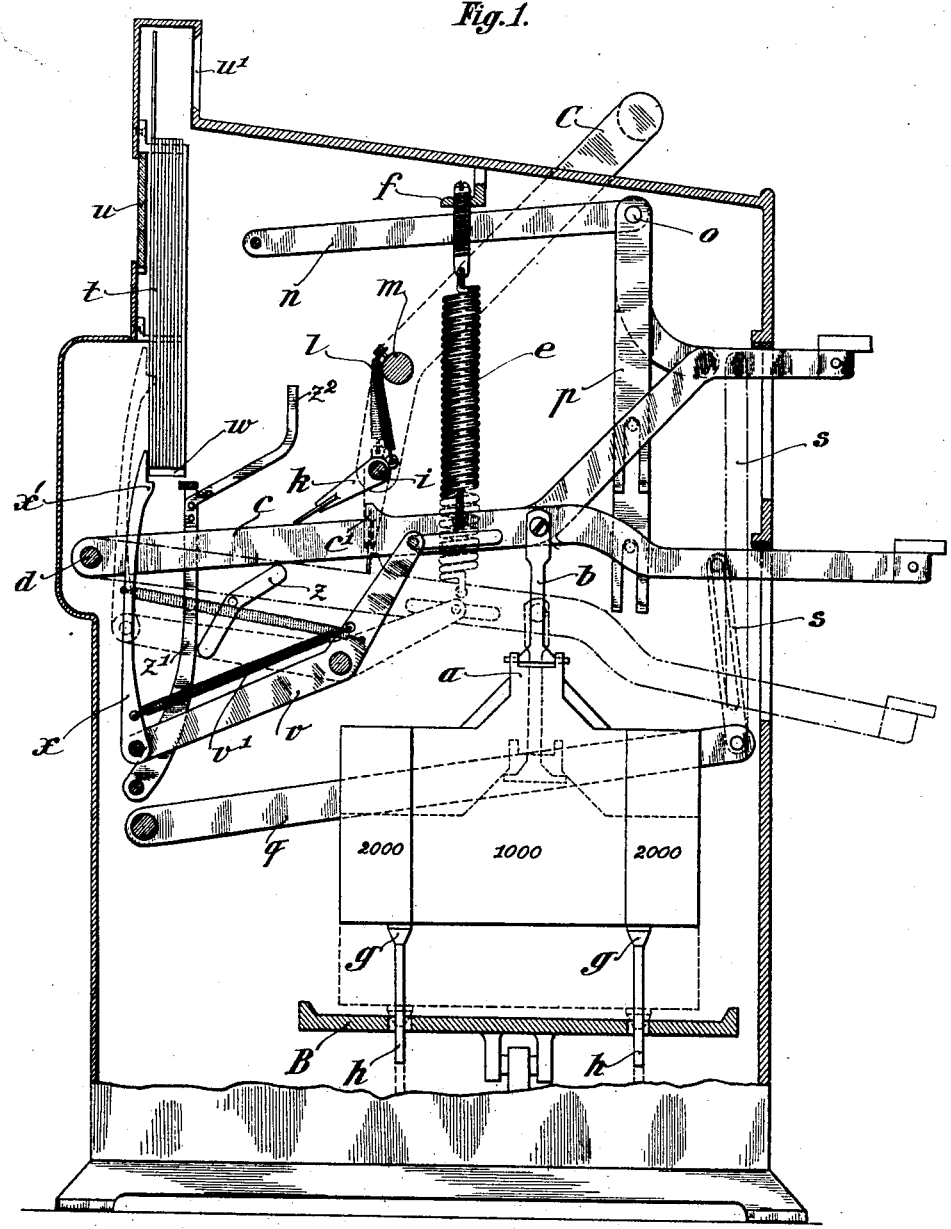
Figure 1 is a vertical view of the system of weighing levers and associated parts involved in the machine.

The weights necessary for weighing small amounts are represented in the annexed drawing with indications in grams. As shown in Fig. 1, each weight is provided with a bail $a$, suspended from a bifurcated member or fork $b$. The bail $a$ is of such dimensions that after depositing the weight (for instance 1000 grams in Fig. 1) upon the scale platform B, the weighing lever may be lowered to such extent that said platform may move freely with respect to the fork $b$. The latter is suspended from a weighing lever $c$ fulcrumed at $d$ and supporting a finger-piece at its extreme end. The weighing lever $c$ is suspended by means of a spring $e$, the tension of which is so adjusted with respect to the corresponding weight that the weight is normally kept in its uppermost position without vibration. The weighing levers in juxtaposition are journaled on a common shaft $d$ (Fig. 5), and their associated springs $e$ are connected to a common angle-rail $f$.

In order to insure that the weights always occupy the same positions relative to the platform B, said weights may be provided with depending, conical lugs $g$ which aline with openings in the platform, as shown in Fig. 1, so that the weights will thus be centered with relation to the platform when lowered. This centering action is facilitated by providing the cones $g$ with depending stems $h$ which are sufficiently long to pass through the platform openings in any position of the weight and are of reduced diameter so as to extend through said openings without touching the walls thereof; said stems also serving to prevent displacement of the weights while the platform is in motion, as well as when the machine itself is being transported from one place to another.

For each weighing-lever a pawl $k$ is provided located above the same and mounted for pivotal movement on a universal bar or shaft $i$; said pawl being subjected to the action of a contractile spring $l$ which causes it to automatically engage a cam $c'$ as soon as the corresponding weighing lever has reached its lowermost position. The releasing of the lock thus produced—i. e., the disengagement of the pawl from said cam—is effected by raising bar $i$ by means of the angular return crank C, the latter being fulcrumed at its apex at $m$ and connected at its lower end to the said bar to support the same. If the crank C is pressed downwardly, its lower end is caused to swing upwardly in a counter-clockwise direction, carrying with it bar $i$ and pawls $k$, the latter being thereby released from any of the cams $c'$ with which they may be engaged. Any weighing lever $c$ which is depressed at that time is thus unlocked and is lifted upward by the action of its respective spring $e$. During this movement the lifting action of the spring $e$ exerted upon the weighing lever is transmitted by the latter to the pawl $k$ and bar $i$, and, hence, to crank C which is thus restored to its initial position.

Figure 2:
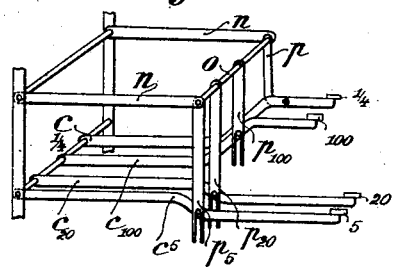
Fig. 2 is a perspective view of the levers utilized in weighing combinations involving a quarter of pound.
Figure 3:
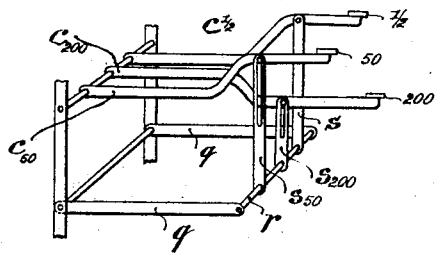
Fig. 3 is a similar view of the arrangement for combinations involving half a pound.

In Figs. 2 and 3 are represented the special levers and their one-way connections, together with the system of weighing levers. In Fig. 2, a rocking frame $n, o, n$ is connected by a rod $p$ with the special lever $c_{\frac{1}{4}}$. The frame $n, o, n$ is also connected by the push rods $p_{100}$, $p_{20}$ and $p_5$ to the levers for respectively weighing 100 grams, 20 grams and 5 grams. If the special lever corresponding to $\frac{1}{4}$ pound is depressed, the weights mentioned are simultaneously set down upon the scale platform B. The return of the weights to their ineffective position is brought about by means of the return crank C. If in similar way the weights for $\frac{1}{2}$ pound are to be set down upon the platform, the special lever $c_{\frac{1}{2}}$ (represented in Fig. 3) is depressed, thereby rocking the frame $q, r, q$ and moving downward with it by means of the push rods $s_{50}$ and $s_{200}$ the levers $c_{50}$ and $c_{200}$.

The indicating mechanism consists of ten numbered disks $t$ arranged one behind another with the 0 outermost and guided in a frame $w$, the digits or numbers on said disks being visible through the sight window $u$ in the front wall of the casing. Each weighing lever $c$ has a pin-and-slot connection with the end of one arm of an angle lever $v$, the other arm of which has pivotally connected to it the lower end of a lifter lever $x$ which is connected by a spring $v'$ with the first-named arm. The upper ends of the lifter levers $x$ are provided with shoulders $x'$ for engagement with the lower edges of the indicating disks $t$, and these shoulders are of different widths for the different weighing levers, so that when any weighing lever is depressed, its associated lifter lever will lift such a number of disks as to expose through the sight window only the proper digit of the number corresponding to the particular weight lowered upon the scale platform. In the construction represented in Fig. 1, the 1000-gram lever is shown in dotted lines in its depressed position, and in such instance the corresponding lifter lever $x$ will move one disk only (the zero disk), with the result that the digit 1 will show through the sight window. When the weighing levers are thereafter raised to their normal positions, the lifter levers $x$ and the respective indicating disks $t$ are lowered again.

In the event that before the weighing action proper takes place a vessel is to be balanced on the receiving platform A by means of corresponding weights, it is necessary to neutralize this weight before the proper weight for the regular weighing operation is adjusted. For this purpose a zero-control lever (see Fig. 5) is provided, which lies behind the special ¼ pound lever and acts upon a rocking bail $z^1$ by means of an angle lever $z$ in such a manner that all of the lifter levers $x$ are shifted out of line with the disks. This zero-control lever is not locked in its lowermost position, but is moved back to its ineffective position immediately after it has effected a lowering of the indicating disks $t$.

The zero-control lever and the special ¼ pound and ½ pound levers are disposed between the weights of highest value, as represented in Fig. 5; whereas the weight carried by the remaining weighing levers are interfitted, and certain of them project at opposite ends beyond the ends of contiguous weights, such construction enabling the weights to be arranged on a small portion of the scale platform.

In order to avoid disturbing said disks during their normal return movement when they are being lowered by the shoulders $x^1$, the bail lever $z^1$ is provided with an extension $z^2$ which projects into the path of the pawl-bar $i$ and is turned by the latter during the last part of the stroke of the crank C. All of the lifter levers $x$ and likewise all of the indicating disks $t$ are thereby brought back into their initial position of rest.

For the convenience of the shopper the play of the balance hands $A^1$ and $B^1$ may be transmitted to the level of the sight window $u$, so that it may be readily observed, the transmitting devices consisting, for instance, of a system of levers represented in dotted lines in Fig. 4. One hand $A^2$ may be fixed in such case and only the hand $B^2$ caused to move during the play of the scale platform B.

A second sight window $u'$ may be provided to expose the movements of the indicating disks to the clerk, so that like digits are provided on the rear sides of the disks. The rear digits on the disks will be arranged in reverse order which, nevertheless, will not cause any inconvenience in reading.

A further advantage of the present weighing machine resides in the fact that the scale platform may be secured without any difficulty, because the mechanism for lowering and lifting the weights is quite independent of the balance proper, which latter may therefore be adjusted in the same manner as the individual weights.

I claim as my invention:—

1. In a weighing machine, the combination, with a scale platform and a set of weights adapted to rest upon it in their lowered position, of weight-shifting mechanism comprising a set of weighing levers, from each of which a weight is suspended; and a set of supporting springs, one individual to each lever, for holding said levers and weights normally in elevated position, the tension of the springs being so adjusted as to normally balance the levers and associated weights.

2. In a weighing machine, the combination, with a scale platform and a set of weights adapted to rest upon it in their lowered position, of weight-shifting mechanism comprising a set of weighing levers, from each of which a weight is suspended; a set of supporting springs, one individual to each lever, for holding said levers and weights normally in elevated position; a locking pawl individual to each lever for holding the same in depressed position; and a return crank for releasing said pawls to permit the depressed levers to be returned by their respective springs; said pawls being hingedly related to said crank, whereby the upward pull exerted upon a depressed lever by its spring is transmitted from the lever to its associated pawl and thence to the crank to return the same to its initial position after having been actuated.

3. In a weighing machine, the combination, with a scale platform and a set of weights adapted to rest upon it in their lowered position, of weight-shifting mechanism comprising a set of weighing levers, from each of which a weight is suspended; a set of supporting springs, one individual to each lever, for holding said levers and weights normally in elevated position; a locking pawl individual to each lever for holding the same in depressed position; a common supporting bar whereon all of the pawls are mounted; and a two-armed crank for releasing said pawls to permit the depressed levers to be returned by their respective springs; said crank being fulcrumed at the intersection of its two arms and having its lower arm connected to support said pawl bar, whereby the upward pull exerted upon a depressed lever by its spring is transmitted to its associated pawl and thence through said pawl bar to the crank to return the same to its initial position after having been actuated.

4. In a weighing machine, the combination, with a scale platform, and a plurality of weights adapted to rest upon it in their lowered position, of a plurality of weighing levers, one for each weight, for lowering the same upon the platform; a special lever; and a set of connections between the special lever and all of the weighing levers for operating the latter simultaneously when said special lever is depressed, said connections enabling any individual weighing lever to be directly operated independently of the other weighing levers.

5. In a weighing machine, the combination, with a scale platform, and a plurality of weights adapted to rest upon it in their lowered position, of a special lever; a rocking frame connected to said lever to be operated thereby; a plurality of weighing levers, one for each weight, for lowering the same upon the platform; and connections between said frame and said weighing levers for operating all of the latter when the frame is rocked by the special lever, but enabling any individual weighing lever to be directly operated independently of the other weighing levers.

6. In a weighing machine, the combination, with a scale platform, and a plurality of weights adapted to rest upon it in their lowered position, of a plurality of weighing levers, one for each weight, to lower the same upon the platform; a set of digit-bearing indicating disks for each denominational unit, the disks of each set being arranged one behind another; and a set of shifting levers associated with each set of disks and adapted to shift different definite numbers of disks so as to expose different digits, said shifting levers being connected to the different weighing levers for operation thereby.

7. A weighing machine, according to claim 6, in which the shifting levers are disposed beneath the disks for upward movement, said levers having shoulders of different widths at their upper ends to engage different numbers of disks.

8. In a weighing machine, the combination, with a scale platform, and a plurality of weights adapted to rest upon it in their lowered position, of a plurality of weighing levers, one for each weight, to lower the same upon the platform; a set of digit-bearing indicating disks for each denominational unit, the disks of each set being arranged one behind another; a set of shifting levers associated with each set of disks and adapted to shift different definite numbers of disks so as to expose different digits, said shifting levers being connected to the different weighing levers for operation thereby; a special lever; and a connection between the special lever and the shifting levers for simultaneously throwing out all of the shifting levers when said special lever is operated.

9. A weighing machine, according to claim 8, in which the connection between the special lever and the shifting levers comprises a bail adapted to engage all of said shifting levers at the same time, and a rocker operated by the special lever and adapted to engage and actuate said bail.

10. In a weighing machine, the combination, with a scale platform, of a plurality of weighing levers corresponding to different definite amounts; a weight suspended from each lever; and adapted to be lowered thereby upon the platform and a plurality of special levers for weighing combinations of such amounts disposed between the weights of highest value; the weights carried by the remaining weighing levers being interfitted and certain of them projecting at opposite ends beyond the ends of contiguous weights.

In testimony whereof I affix my signature.

KARL JUKES.